J. MEYER & I. SILVERSMITH.
ANIMAL COLLAR FASTENER.
APPLICATION FILED NOV. 25, 1908.
965,210.
Patented July 26, 1910.
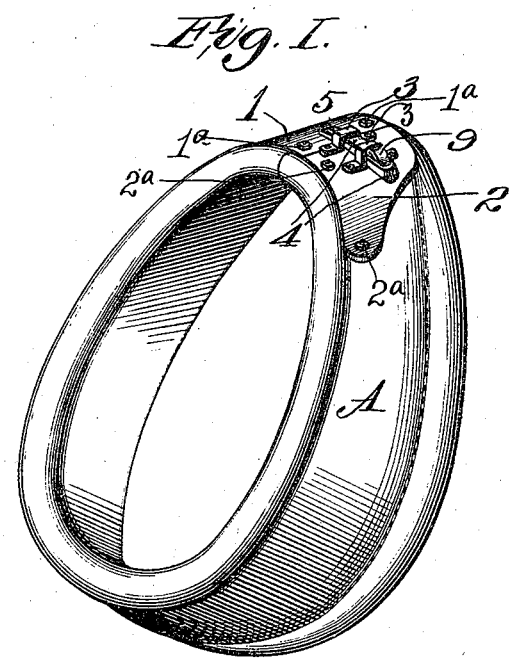
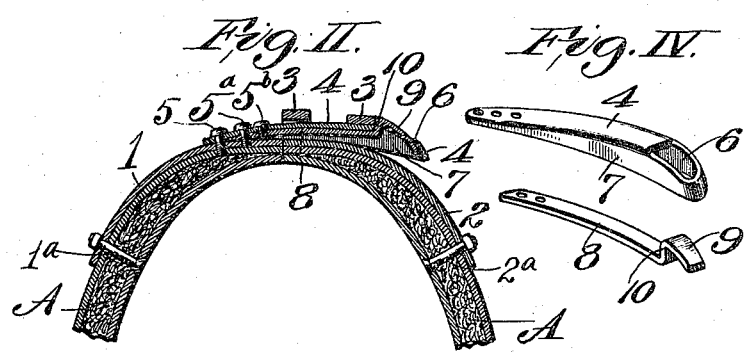
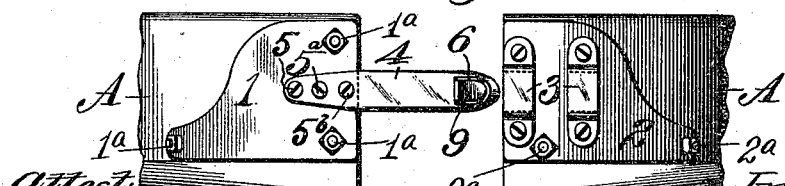
Inventors:
Jacob Meyer,
Isaac Silversmith,
by Geo. H. Knight, Atty.

UNITED STATES PATENT OFFICE.

JACOB MEYER AND ISAAC SILVERSMITH, OF ST. LOUIS, MISSOURI.

ANIMAL-COLLAR FASTENER.

965,210.   Specification of Letters Patent.   Patented July 26, 1910.

Application filed November 25, 1908. Serial No. 464,388.

*To all whom it may concern:*

Be it known that we, JACOB MEYER and ISAAC SILVERSMITH, citizens of the United States of America, residing at the city of St. Louis, in the State of Missouri, have invented certain new and useful Improvements in Animal-Collar Fasteners, of which the following is a full, clear, and exact description, reference being had to the accompanying drawings, forming part of this specification.

Our invention relates more particularly to a fastener for animal collars and it has for its object the production of a fastener of this description so constructed as to provide for the collar being readily opened and closed and also to provide a fastener which is adjustable to permit of the collar being used in a more or less widened condition to fit the necks of different animals according to the thickness of their necks.

A further object of our invention is to provide an animal collar fastener including plates to which the fastener members are attached and which are shaped to conform to the head or top of the collar when in use, in order that such portion of the collar may be shaped to correspond to the animal's neck, and injury to the shoulders of the animal by wear of the collar thereagainst be greatly lessened. These members also serve to produce a peak at the top of the collar that permit of the harness hame straps being securely fastened to the collar in a manner to prevent slippage thereof over the rim of the collar.

A further object of the invention is to provide an animal collar fastener which may be so readily manipulated as to occasion but an instant's exertion on the part of the person handling the collar to close the collar after it has been removed from an animal's neck and thereby avoid breakage of the collar at the throat, which is extremely liable to occur in animal collars when they are carelessly handled in an open condition and spread with the result of causing strain upon the throat of the collar.

Figure I is a perspective view of a collar with our fastener applied thereto, the collar being shown in a closed condition and the members of the fastener being secured to each other, as in the use of the collar upon the neck of an animal. Fig. II is an enlarged vertical longitudinal section taken through the upper end of the collar and our fastener. Fig. III is a top or plan view of the top of the collar and our fastener in open condition. Fig. IV is a perspective view of the latch members of our fastener, the parts being separated from each other.

In the accompanying drawings, A designates an animal collar to which our fastener is shown applied and which is transversely divided so as to open at its upper end to permit of the sides of the collar being spread sufficiently when the collar is to be fitted to the neck of an animal by which it is to be worn. 1 and 2 designate fastener plates that are secured by bolts $1^a$ and $2^a$ respectively to the collar and which are shaped to correspond to the divided upper ends of the sides of the collar and by which said ends are held in any shape corresponding to the contour of the top of an animal's neck, in order that when the collar is in a closed condition around the animal's neck, it will fit properly to the neck. The fastener plates further serve to afford rigidity to the upper ends of the collar and to afford a peak back of the rim of the collar upon which the harness hame straps may rest.

The fastener plate 2 of our collar fastener has secured to it a pair of loop keepers 3 that are spaced apart from each other and extend transversely of the top of the collar.

4 designates a hollow inwardly tapering latch tongue providing a casing or housing that is secured by suitable fastening means, such as a rivet $5^a$, to the fastener plate 1, and which projects a distance beyond the end of said fastener plate, and the upper end of the side of the collar to which said fastener plate is attached. Another rivet 5 extends through the rear extremity of the latch tongue 4 and into the collar so as to prevent the movement of the latch tongue 4 on its forward fastening rivet $5^a$. The hollow latch tongue 4 is of such dimensions as to permit of its ready passage through the loop keepers 3 carried by the fastener plate 2, and it is provided near its forward end with a catch aperture 6 and has downwardly extending side flanges 7.

8 is an elongated spring catch that is secured by a rivet $5^b$ to the latch tongue 4 and also to the fastener plate 1 and the latch tongue 4 by the rivet $5^a$ at its rear end and which extends forwardly beneath and within the latch tongue. The spring catch 8 is provided near its forward end with an inwardly curved finger piece 9 that is adapted to extend upwardly into the catch aperture 6 in the latch tongue 4, the catch being so bent outwardly at the location of the finger piece as to provide a shoulder 10 at the rear end of the finger piece which is adapted to engage either of the loop keepers 3 when the latch tongue with its spring catch is passed through the keepers.

In the practical use of our fastener upon a collar, the latch tongue 4 and the spring catch 8 associated therewith may be passed through either one or both of the loop keepers 3 according to whether it is desired to use the collar in a partly spread condition to increase its width or in an entirely closed condition. In the instance of using the collar in the completely closed condition, the latch tongue with its spring catch is passed through both of the loop keepers and the shoulder at the rear end of the finger piece 9 of the catch engages the loop keeper 3 farthest removed from the end of the side of the collar with which said loop keeper is associated to serve as a means for holding the sides of the collar from spreading apart. When, however, it is desired to use the collar in a partly open condition, the latch with its spring catch is passed only through the loop keeper 3 nearest the end of the side of the collar with which the keepers are associated, and the spring catch, by engaging this loop keeper, serves to hold the sides of the collar from spreading apart to any greater degree than that permitted by the engagement of the spring catch with the innermost keeper.

We claim:—

A fastener for a collar having an open end, comprising two plates secured to the collar one on each side of the open end, a loop keeper secured to one of the plates, a hollow rearwardly tapering latch tongue having a catch aperture in the top of its front end and providing an elongated casing or housing, an elongated spring catch located within and extending rearwardly of the latch tongue and formed with a forwardly curved finger piece at its front end, adapted to close the catch aperture, and having a shoulder extending through the catch aperture, fastening means securing the rear part of the catch to the latch tongue, fastening means securing the rear extremity of the catch to both the rear part of the latch tongue and to the other plate, and fastening means extending through the rear extremity of the latch tongue and into the collar for securing the latch tongue from movement on its forward fastening.

JACOB MEYER.
ISAAC SILVERSMITH.

In the presence of—
E. B. KNIGHT,
H. G. COOK.